US010154018B2

(12) United States Patent
Brandsma et al.

(10) Patent No.: US 10,154,018 B2
(45) Date of Patent: Dec. 11, 2018

(54) METHOD AND SYSTEM FOR FACILITATING NETWORK JOINING

(71) Applicant: NXP B.V., Eindhoven (NL)

(72) Inventors: Ewout Brandsma, Eindhoven (NL);
Elisabeth Eichhorn, Eindhoven (NL);
Piotr Polak, Eindhoven (NL); Ruud Hendricksen, Eindhoven (NL)

(73) Assignee: NXP B.V., Eindhoven (NL)

( * ) Notice: Subject to any disclaimer, the term of this patent is extended or adjusted under 35 U.S.C. 154(b) by 57 days.

(21) Appl. No.: 15/047,618

(22) Filed: Feb. 18, 2016

(65) Prior Publication Data
US 2016/0248738 A1 Aug. 25, 2016

(30) Foreign Application Priority Data
Feb. 19, 2015 (EP) .................. 15155734

(51) Int. Cl.
*H04L 29/06* (2006.01)
*H04W 12/04* (2009.01)
(Continued)

(52) U.S. Cl.
CPC ....... *H04L 63/0492* (2013.01); *H04B 5/0031* (2013.01); *H04L 63/0281* (2013.01);
(Continued)

(58) Field of Classification Search
CPC ....... H04L 9/08; H04L 9/0825; H04L 9/0838; H04L 63/08; H04L 63/0281;
(Continued)

(56) References Cited

U.S. PATENT DOCUMENTS 5,604,807 A * 2/1997 Yamaguchi .............. H04L 9/12
380/259
5,850,445 A * 12/1998 Chan .................... H04W 12/06
380/247
(Continued)

FOREIGN PATENT DOCUMENTS

| EP | 2 453 398 A1 | 5/2012 |
|----|--------------|--------|
| EP | 2 573 948 A1 | 3/2013 |
| WO | 2014/205243 A1 | 12/2014 |

OTHER PUBLICATIONS

Extended European Search Report for Patent Appl. No. 15155734.5 (dated Aug. 11, 2015).
(Continued)

*Primary Examiner* — Hosuk Song

(57) ABSTRACT

A method for facilitating network joining is disclosed, wherein, while a communication session is active between a network gateway and an NFC device comprised in or connected to a networkable device, the following steps are performed: the network gateway obtains a first cryptographic key associated with the networkable device; the network gateway encrypts, using said first cryptographic key, a network key associated with a network; the network gateway provides the encrypted network key to the networkable device, such that the networkable device may decrypt the encrypted network key using a second cryptographic key. Furthermore, a corresponding computer program product and a corresponding system for facilitating network joining are disclosed.

18 Claims, 7 Drawing Sheets

(51) Int. Cl.
H04B 5/00 (2006.01)
H04W 12/06 (2009.01)
H04W 4/00 (2018.01)

(52) U.S. Cl.
CPC ........ *H04L 63/0435* (2013.01); *H04L 63/061* (2013.01); *H04L 63/065* (2013.01); *H04L 63/0846* (2013.01); *H04W 4/008* (2013.01); *H04W 12/04* (2013.01); *H04W 12/06* (2013.01); *H04L 2463/062* (2013.01)

(58) Field of Classification Search
CPC . H04L 63/0435; H04L 63/061; H04L 63/065; H04L 63/0846; H04L 2463/062; H04W 4/008; H04W 12/04; H04W 12/06; H04W 84/18
USPC ......... 380/270, 277; 713/168–172, 189, 192, 713/153
See application file for complete search history.

(56) References Cited

U.S. PATENT DOCUMENTS

| | | | | |
|---|---|---|---|---|
| 6,148,405 | A * | 11/2000 | Liao | H04L 9/3273 380/255 |
| 8,601,266 | B2 * | 12/2013 | Aabye | G06F 21/445 380/279 |
| 8,621,595 | B2 * | 12/2013 | Hayhow | G06Q 20/3829 380/277 |
| 8,909,556 | B2 * | 12/2014 | Huxham | H04L 63/0464 705/64 |
| 9,514,339 | B2 | 12/2016 | Brandsma et al. | |
| 9,762,295 | B2 | 9/2017 | Brandsma et al. | |
| 9,774,637 | B2 | 9/2017 | Brandsma et al. | |
| 9,800,554 | B2 | 10/2017 | van Roermund et al. | |
| 2013/0141223 | A1 | 6/2013 | Brandsma et al. | |
| 2013/0198813 | A1 | 8/2013 | van Roermund et al. | |
| 2013/0211761 | A1 | 8/2013 | Brandsma et al. | |

OTHER PUBLICATIONS

Kodritsch, R. "RFID brand protection—securing your most valuable assets", NXP, 7 pgs., retrieved from the internet at: https://blog.nxp.com/security/rfid-brand-protection-securing-your-most-valuable-assets (Jul. 23, 2014).

ZigBee Alliance, 2 pgs., retrieved from the internet archive Jun. 13, 2018 at: https://web.archive.org/web/20141125180634/http://zigbee.org:80/ (Nov. 25, 2014).

UPnP Forum, 2 pgs., retrieved from the internet archive Jun. 13, 2018: https://web.archive.org/web/20141111200746/http://www.upnp.org/ (Nov. 11, 2014).

"Our Goals for the Internet of Things", BuildItSecure.ly, retrieved from the internet archive Jun. 13, 2018: https://web.archive.org/web/20141018112146/http://builditsecure.ly/ (Apr. 29, 2014).

"Connection Handover—Technical Specification NFC Forum Connection Handover 1.2", NFC Forum, 27 pgs., (Jul. 7, 2010).

"The Common Criteria", Common Criteria, 2 pgs., retrieved from the internet Jun. 13, 2018 at: https://web.archive.org/web/20141007215013/https://www.commoncriteriaportal.org/ (Oct. 7, 2014).

"Connect and Enjoy", dlna, 1 pg., retrieved from the internet archive Jun. 13, 2018 at: https://web.archive.org/web/20141029001854/http://www.dlna.org/ (Oct. 29, 2014).

"Bluetooth", Wikipedia, 27 pgs., retrieved from the internet archive Jun. 13, 2018 at: https://web.archive.org/web/20141024205759/http://en.wikipedia.org/wiki/Bluetooth (Oct. 24, 2014).

"Security Services Specification", ZigBee Specification, ZigBee Standards Organization, 135 pgs., retrieved from the internet at: http://www.zigbee.org/wp-content/uploads/2014/11/docs-05-3474-20-0csg-zigbee-specification.pdf (Sep. 19, 2012).

* cited by examiner

METHOD AND SYSTEM FOR FACILITATING NETWORK JOINING

CROSS-REFERENCE TO RELATED APPLICATIONS

This application claims the priority under 35 U.S.C. § 119 of European patent application no. 15155734.5, filed on Feb. 19, 2015, the contents of which are incorporated by reference herein.

FIELD

The present disclosure relates to a method for facilitating network joining. Furthermore, the present disclosure relates to a corresponding computer program product and to a corresponding system for facilitating network joining.

BACKGROUND

Today, electronic devices are often networkable devices. That is to say, such devices may often be incorporated into wireless networks. In order to join a wireless network, a networkable device may have to receive a network key from a network gateway. For instance, in a ZigBee network, the so-called "coordinator" may be regarded as such a network gateway. A network key is a cryptographic key which enables the networkable device to communicate securely on the network. It is relatively difficult to provide a network key to a networkable device in a secure, yet convenient, manner.

SUMMARY

Example embodiments of a method for facilitating network joining are disclosed. In an embodiment, the following steps are performed while a communication session is active between a network gateway and an NFC device comprised in or connected to a networkable device: the network gateway obtains a first cryptographic key associated with the networkable device; the network gateway encrypts, using said first cryptographic key, a network key associated with a network; the network gateway provides the encrypted network key to the networkable device, such that the networkable device may decrypt the encrypted network key using a second cryptographic key.

In illustrative embodiments, said communication session is a communication session between said NFC device and a further NFC device comprised in the network gateway.

In further illustrative embodiments, the network gateway provides the encrypted network key to the networkable device by causing the further NFC device to write said encrypted network key to said NFC device.

In further illustrative embodiments, said communication session comprises a first part, which is a communication session between said NFC device and a further NFC device comprised in a proxy device, and a second part, which is a wireless communication session between the proxy device and the network gateway.

In further illustrative embodiments, the network gateway provides the encrypted network key to the networkable device by sending said encrypted network key to the proxy device, such that the proxy device may cause the further NFC device to write said encrypted network key to said NFC device.

In further illustrative embodiments, the first cryptographic key is a public key and the second cryptographic key is a corresponding private key.

In further illustrative embodiments, the first cryptographic key and the second cryptographic key are secret session keys which are established in a key agreement procedure between the network gateway and the networkable device.

In further illustrative embodiments, a public key associated with the networkable device is used in said key agreement procedure.

In further illustrative embodiments, said public key is retrieved from the NFC device.

In further illustrative embodiments, said public key is retrieved from a cloud database using a device identifier which identifies the networkable device.

In further illustrative embodiments, said device identifier is retrieved from the NFC device.

In further illustrative embodiments, the NFC device is an NFC tag.

Furthermore, a computer program product is disclosed that comprises instructions which, when being executed by a processing unit, cause said processing unit to carry out or control a method as claimed in any preceding claim.

Furthermore, example embodiments of a system for facilitating network joining are disclosed. In an embodiment, the system comprises a network gateway which is arranged to, while a communication session is active between said network gateway and an NFC device comprised in or connected to a networkable device: obtain a first cryptographic key associated with the networkable device; encrypt, using said first cryptographic key, a network key associated with a network; provide the encrypted network key to the networkable device, such that the networkable device may decrypt the encrypted network key using a second cryptographic key.

DESCRIPTION OF DRAWINGS

Embodiments will be described in more detail with reference to the appended drawings, in which.

DESCRIPTION OF EMBODIMENTS

Figure 1:
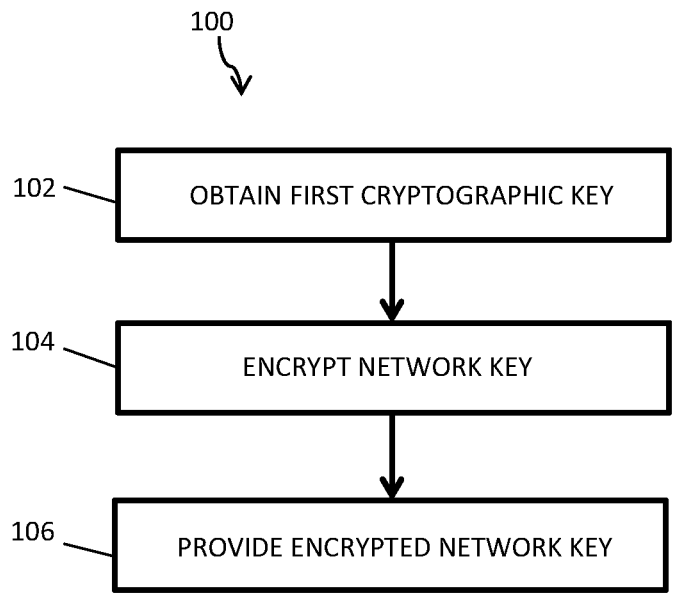
FIG. 1 shows an illustrative embodiment of a method for facilitating network joining.

In order to join a network, a networkable device may have to receive, among others, a network key from a network gateway. This should be done securely, in the sense that the network key should not be exposed in the clear (i.e. in plaintext) while it is being transferred, that the networkable device should be clearly identified and the authenticity of the networkable device—for example, whether it has been certified by a standardization body—should be validated before it may join the network. With regard to the latter, it is noted that non-certified connected devices may appear on the market that are, at first sight, able to interoperate with certified connected devices on a single network. These devices may also illegally carry the logo of the standardization body (and/or the logo of a well-known manufacturer brand) to make consumers believe that they are dealing with a high-quality product that will give them seamless and secure interoperability. The non-certified device may put the interoperability and the security of the whole network at risk. It may also be a malicious device, in the sense that it has been designed to extract a network key in order to break the confidentiality of the network. In any case, its misbehavior may reflect negatively on the reputation of the standardization body and its legitimate adopters. It may cause brand damage and immediate loss of income to device manufacturers and the standardization body. Consumers may have no way of knowing for certain whether a device is certified or not. From a security perspective a new device should not be allowed access to an existing, trusted environment, before a trust relationship has been established. Otherwise, the new device may already activate a malicious process as soon as it is connected to the trusted environment, before its authentication process has been finished. This means that the device's authenticity should be verified before it will be connected to the trusted environment. Therefore this verification should be done outside the trusted network; this is referred to as out-of-band device authentication. In view thereof, there may be a need to facilitate secure network joining. In particular, there may be a need for facilitating the transfer of a network key without exposing it in plaintext while it is being transferred. Furthermore, there may be a need for facilitating out-of-band device authentication.

In accordance with the present disclosure, therefore, a method for facilitating network joining is disclosed, wherein, while a communication session is active between a network gateway and a Near Field Communication (NFC) device comprised in or connected to a networkable device, the following steps are performed: the network gateway obtains a first cryptographic key associated with the networkable device; the network gateway encrypts, using said first cryptographic key, a network key associated with a network; the network gateway provides the encrypted network key to the networkable device, such that the networkable device may decrypt the encrypted network key using a second cryptographic key. Thereby, the network key is not exposed in plaintext outside the network gateway and the networkable device. Furthermore, since an NFC session is active while the steps are performed, which requires a close proximity between the networkable device and the network gateway—or its proxy device, if applicable—an implicit authentication of the networkable device may take place, because the user who brings the devices into close proximity of each other may be able to positively identify the networkable device. More specifically, the user may visually determine, for instance, that the particular networkable device is indeed a device that should join the network.

FIG. 1 shows an illustrative embodiment of a method 100 for facilitating network joining. At 102, the network gateway obtains a first cryptographic key associated with a networkable device. Furthermore, at 104, the network gateway encrypts, using the first cryptographic key, a network key associated with a network. This network key may enable the networkable device to join the network. At 106, the network gateway provides the encrypted network key to the networkable device, such that the networkable device may decrypt the encrypted network key using a second cryptographic key. For example, the first cryptographic key may be a public key of a public-private key pair. In that case, the second cryptographic key is the private key of said key pair, and the networkable device may contain, in a secure storage unit, said private key. Using a public key may enable an uncomplicated, yet secure, transfer of the network key. For the encryption and decryption, cryptographic methods based on RSA cryptography may be used, for example. Alternatively, but without limitation, the first cryptographic key may be a secret session key which is established in a key agreement procedure between the networkable device and the network gateway. The key agreement procedure may be executed while the NFC-based communication session between the networkable device and the network gateway is active. Although the execution of a key agreement procedure may add some complexity to the method, it may be required if certain cryptographic methods are used, for example methods based on elliptic curve cryptography. A well-known example of a key agreement procedure is the Diffie-Hellman key exchange procedure.

Figure 2:
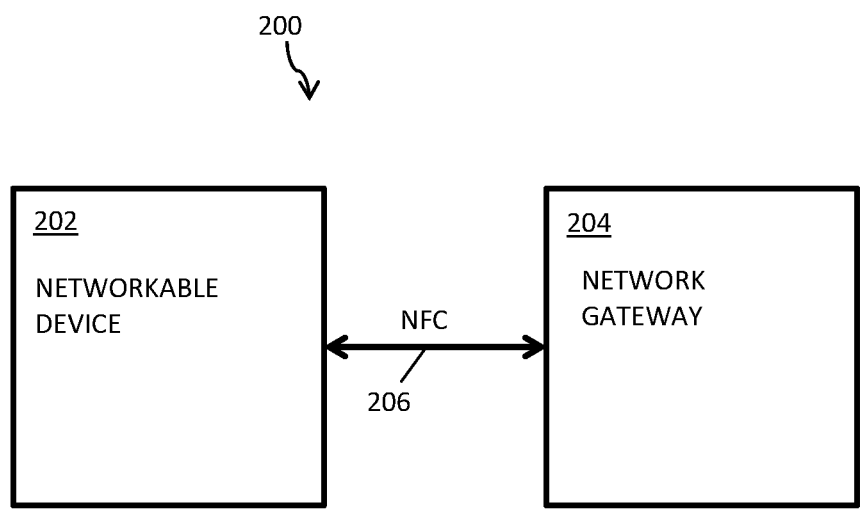
FIG. 2 shows an illustrative embodiment of a system for facilitating network joining.

FIG. 2 shows an illustrative embodiment of a system 200 for facilitating network joining. The system 200 comprises a networkable device 202 which is communicatively coupled to a network gateway 204 by means of an NFC channel 206. The NFC channel 206 may be realized, for example, by establishing NFC between an NFC tag comprised in, or connected to, the networkable device 202 and an NFC reader comprised in the network gateway 204. Alternatively, but without limitation, the networkable device 202 may contain an NFC reader as well, which may establish a connection with an NFC device of the network gateway 204. Using an NFC tag comprised in, or connected to, the networkable device 202, may enable a relatively simple way of establishing NFC. In particular, using an NFC tag may be cost-effective. Furthermore, using an NFC tag may enable powerless commissioning of the networkable device 202. A connected NFC tag, or an NFC tag embedded in the networkable device 202, contains a wired connection to a processing component of the networkable device 202. Said processing component may read and write data from/to the NFC tag through said wired connection, which may enable the processing component to easily retrieve an encrypted network key written into the NFC tag by the network gateway 204, for example. In case the NFC device of the networkable device 202 is an NFC reader, it may also have such a wired connection to a processing component.

Figure 3:
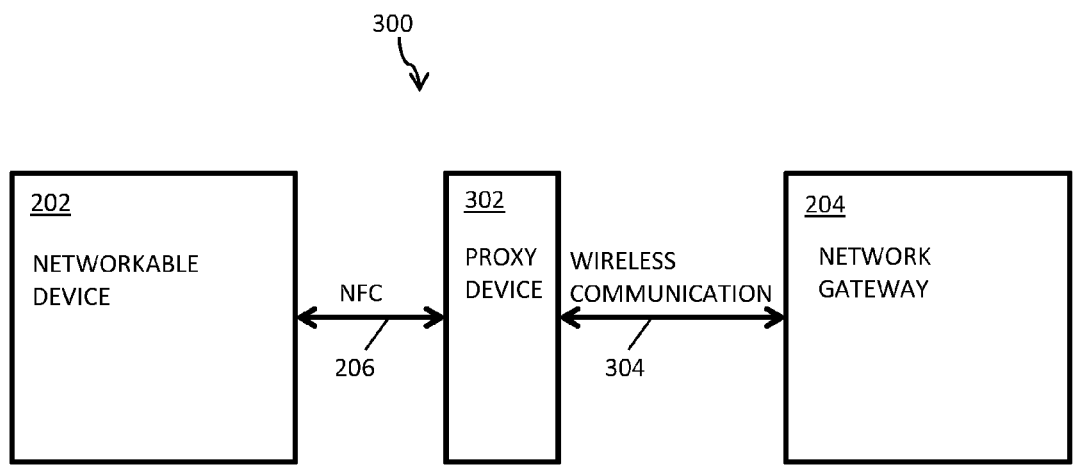
FIG. 3 shows a further illustrative embodiment of a system for facilitating network joining.

FIG. 3 shows a further illustrative embodiment of a system 300 for facilitating network joining. In this system 300, the NFC channel 206 is established between the networkable device 202 and a proxy device 302, which in turn is communicatively coupled to the network gateway 204 by means of a wireless communication channel 304. The wireless communication channel 304 may be based on Wi-Fi communication or 3G cellular communication, for example. The use of the proxy device 302 may facilitate the transfer of network keys to networkable devices 202 that cannot easily be moved, for example to devices which have already been installed in a socket. Since the network gateway 204 may also have a fixed location, it is difficult in those cases to bring the networkable device 202 into close proximity of the network gateway 204. The proxy device 302 may, for instance, be an NFC-enabled mobile device which may easily be brought into close proximity of the networkable device 202. Thus, the proxy device 302 may be regarded as an extension of the network gateway 204, which may enable providing encrypted network keys to immovable networkable devices. Since the steps of the presently disclosed method are, in case the proxy device 302 is used, performed while the networkable device 202 is in close proximity of the proxy device 302—otherwise the NFC session, which forms part of the whole communication session, would end—an adequate security level may still be achieved.

Figure 4:
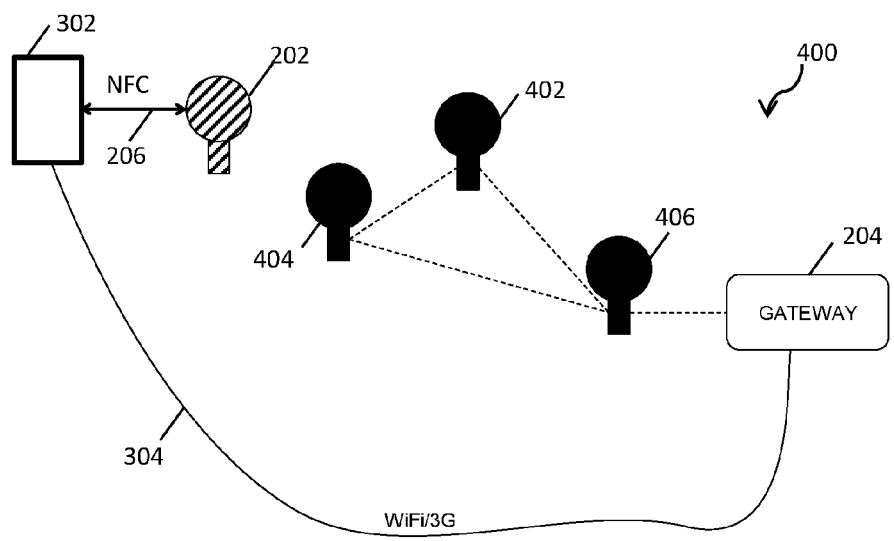
FIG. 4 shows a further illustrative embodiment of a system for facilitating network joining.

FIG. 4 shows a further illustrative embodiment of a system 400 for facilitating network joining. In particular, a wireless mesh network comprising a number of connected or networked devices (lamps 402, 404, 406) and a network gateway 204 is shown. The networked devices 402, 404, 406 and the gateway 204 share a common network key that may be used to ensure message confidentiality, message integrity, message authenticity and/or protection against replay attacks. A fourth, networkable device (lamp 202) has to join the network. Furthermore, the system 400 comprises a proxy device 302. A wireless communication channel 304, for example a Wi-Fi communication channel or a 3G cellular communication channel, is established between the proxy device 302 and the gateway 204. The proxy device 302 may conveniently be embodied as a mobile device, for example an NFC-enabled smart phone.

In this embodiment, the phone 302 obtains the network key from the gateway 204 and distributes it to networkable device 202. However, it is avoided that the network key is available in the clear in the phone 302, on the NFC interface 206, or on the wireless connection 304 between the phone 302 and the gateway 204. The networkable device 202 has a public-private key pair, with its public key exposed in its NFC tag and its private key stored securely. Thus, in an NFC tag comprised in, or connected to, the networkable device 202 a public key associated with said networkable device 202 is stored. In this embodiment, in order to transfer the network key securely to the networkable device 202, the following steps are performed:

1) The phone 302 reads the public key from the NFC tag of the networkable device 202;
2) The phone 302 sends the public key via the wireless connection 304 to the gateway 204;
3) The gateway 204 encrypts the network key with this public key;
4) The gateway 204 returns the encrypted network key to the phone 302 via the wireless connection 304;
5) The phone 302 writes the encrypted network key into the NFC tag of the networkable device 202;
6) Upon or after said writing, the networkable device 202 is powered up and reads the encrypted network key from its NFC tag via a wired connection;
7) A processing component of the networkable device 202 decrypts the encrypted network key using its private key and joins the network using the network key.

It should be noted that the action of touching the networkable device 202 with the phone 302, or bringing it in close proximity thereof, positively identifies the former as a device that should join the network. In other words, the networkable device 202 may implicitly be authenticated by the end-user as a device that, in his opinion (which may among others be based on a visual inspection), legitimately intends to join the network. Thus, in this way, it may be avoided that an arbitrary device can send its public key to the gateway 204 in an attempt to get hold of the network key. The same is true for embodiments in which a direct NFC communication channel is established between the gateway 204 and the networkable device 202. Furthermore, the networkable device 202 does not have to be powered during the NFC-touch action. This is useful for devices that are most conveniently commissioned before supplying power to them (e.g. connected light-bulbs before they are screwed into a socket).

Figure 5:
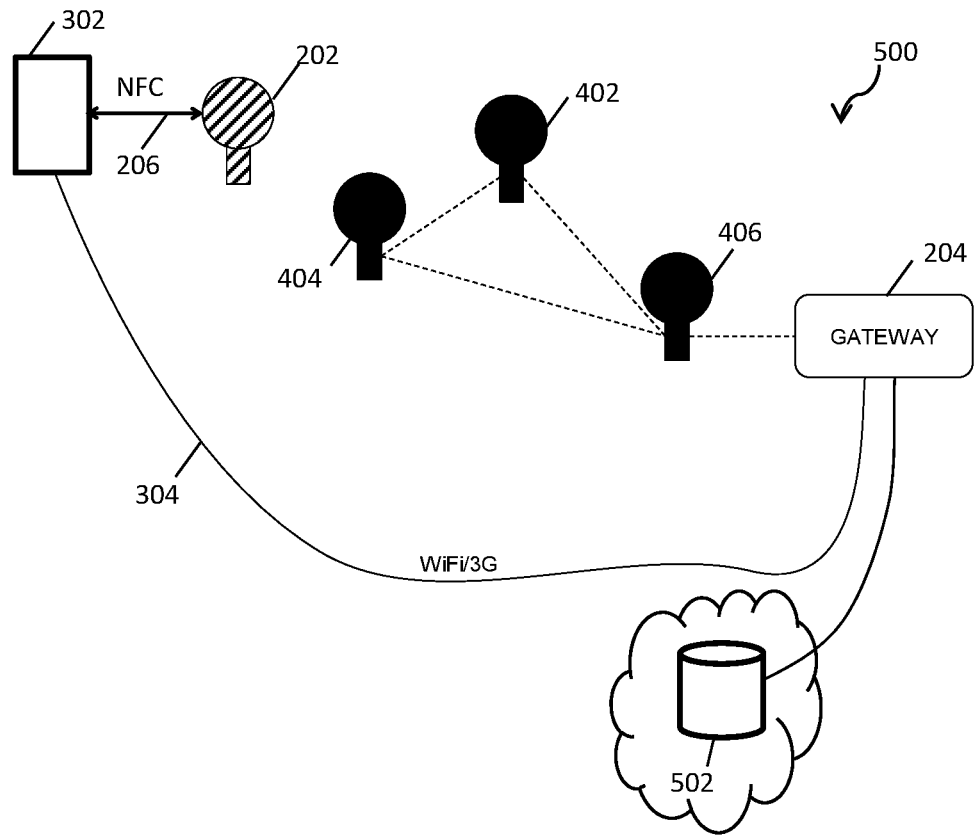
FIG. 5 shows a further illustrative embodiment of a system for facilitating network joining.

FIG. 5 shows a further illustrative embodiment of a system 500 for facilitating network joining. The system 500 comprises the same components as the system 400 shown in FIG. 4. In addition, the system 500 comprises a cloud database 502 in which public keys may be stored. Again, the networked devices 402, 404, 406 and the gateway 204 share a common network key which is used to encrypt the messages sent between them. In this example, it is assumed that the gateway and the networked devices 402, 404, 406 are certified devices according to a particular standard (e.g. ZigBee including security design guidelines) or from a particular manufacturer. This means that they have been properly designed both from an interoperability perspective and from a security perspective. Now, when a consumer has purchased a fourth, networkable device (lamp 202) which shall be introduced into the network, the authentication of said networkable device 202 as a certified device may be required in order to obtain the network key.

In order to realize this authentication, the public key is not obtained directly from the networkable device 202 through its NFC tag. Instead, it is obtained from a trusted cloud service containing a cloud database 502 wherein public keys are stored for certified devices. Each certified networkable device may have a device identifier (ID) that is exposed through its NFC tag. The device identifier may uniquely identify a certified networkable device or a type of certified networkable devices. Also, the networkable device 202 has a public-private key pair and has its private key stored securely, whereas the public key is associated with its ID by the cloud service. In this embodiment, in order to transfer the network key securely to the networkable device 202, the following steps are performed:

1) The phone 302 reads the ID from the NFC tag of networkable device 202;
2) The phone 302 sends the ID via the wireless connection 304 to the gateway 204.
3) The gateway 204 sends the ID subsequently to the cloud database 502;
4) The cloud database 502 looks up the public key corresponding to the ID;
5) If the cloud database 502 finds an entry for this ID it returns the corresponding public key;
6) The gateway 204 encrypts the network key with this public key;
7) The gateway 204 returns the encrypted network key to the phone 302 via the wireless connection 304;
8) The phone 302 writes the encrypted network key into the NFC tag of networkable device 202;
9) Upon or after said writing, the networkable device 202 is powered up and reads the encrypted network key from its NFC tag via a wired connection;
10) A processing component of the networkable device 202 decrypts the network key using its private key and joins the network using the network key.

It is noted that in this embodiment authentication takes place completely out-of-band, using NFC, the phone's wireless connection to the gateway 204 and the gateway's internet access to the cloud database 502. No network connection needs to be built up from networkable device 202 through the network to be joined, before this network is actually joined (i.e. before the network key is shared with the networkable device 202). In other words, no form of contact through the in-band wireless network is permitted, until the networkable device 202 is authenticated as a certified device. This may prevent security exploits by a non-certified and possibly even malicious networkable device 202 before authentication; unless a device is authenticated it is not allowed to make contact with the in-band network. Furthermore, even if the ID is read from the NFC tag by an attacker, neither the public key, nor the encrypted network key are of any value to him, because he has no knowledge of the private key which is stored securely in the networkable device 202. Furthermore, the public key cannot be replaced via a "man-in-the-middle" attack, because it is stored at a trusted cloud service. Furthermore, the networkable device 202 does not have to be powered during the NFC-touch action. This is useful for devices that are most conveniently commissioned before supplying power to them (e.g. connected light-bulbs before they are screwed into a socket). Furthermore, customers may authenticate a product before a purchase by accessing, using their mobile phone, the trusted cloud service to verify whether the ID is known.

Figure 6:
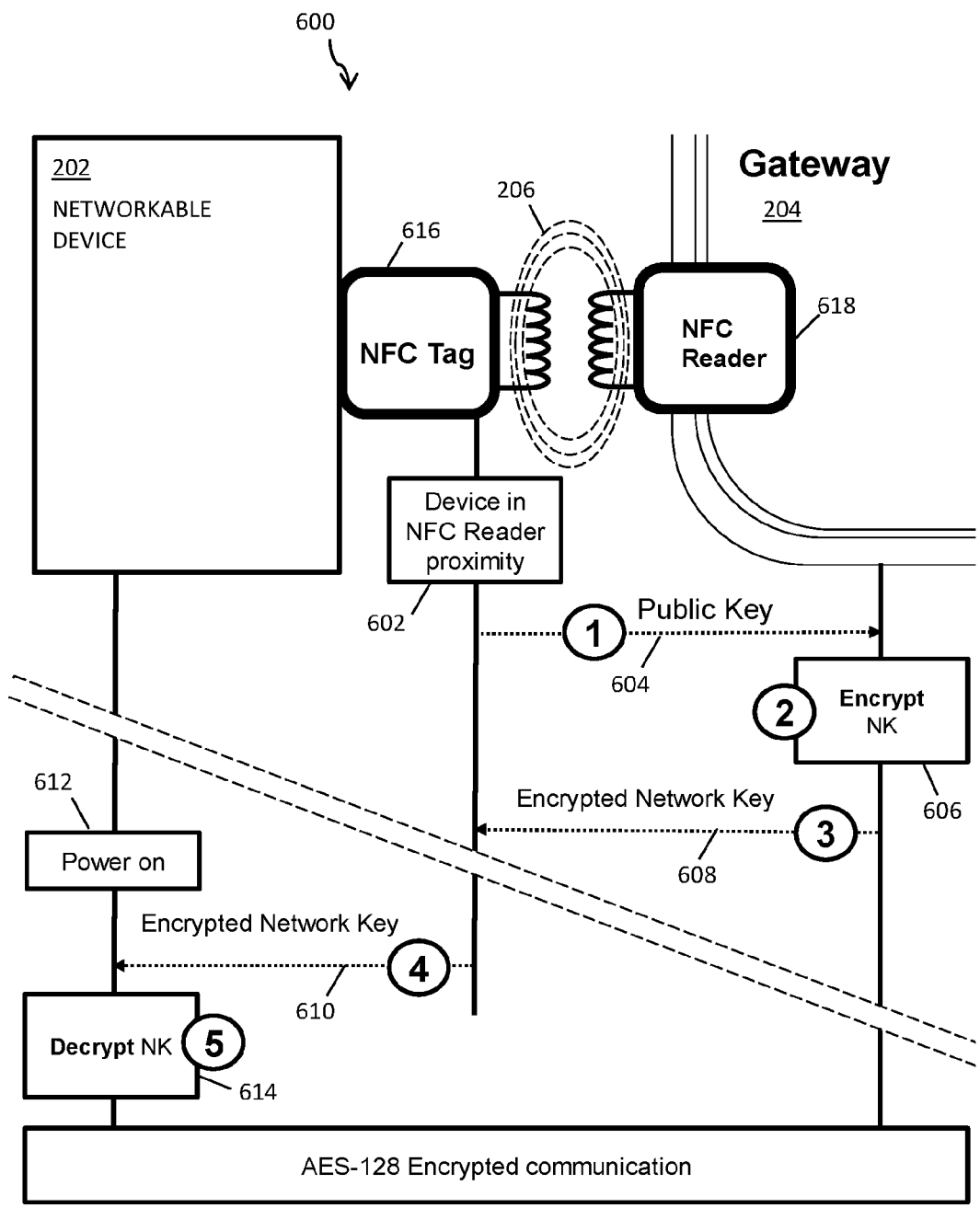
FIG. 6 shows a further illustrative embodiment of a method for facilitating network joining.

FIG. 6 shows a further illustrative embodiment of a method 600 for facilitating network joining. In particular, it shows an example of a more detailed sequence of steps for providing a network key to the networkable device 202. The method 600 is applied in a system which comprises a networkable device 202 and a gateway 204, between which a NFC session may be established. In particular, the NFC channel may established between an NFC tag 616 comprised in, or connected to, the networkable device 202, and an NFC reader 618 comprised in the gateway 204. The NFC tag 616 may be a so-called "Connected Tag", i.e. a tag which has a wired connection to at least one processing component of the networkable device 202. Through the NFC tag 616, the networkable device 202 exposes a public key. The network to be joined is, for example, a ZigBee network. In order to initiate the method, the user brings, at 602, the networkable device 202 into close proximity of the gateway 204, in particular to the NFC reader 618, such that an NFC session becomes active between the NFC tag 616 and the NFC reader 618. Furthermore, in this embodiment, in order to transfer the network key securely to the networkable device 202, the following steps are performed:

1) At 604, the gateway 204 reads the public key from the NFC tag 616.

2) At 606, the gateway 204 encrypts the network key with this public key;

3) At 608, the gateway 204 writes the encrypted network key into the NFC tag 616;

4) At 612, upon or after said writing, the networkable device 202 is powered up and reads, at 610, the encrypted network key from its NFC tag through a wired connection;

5) At 614, a processing component of the networkable device 202 decrypts the encrypted network key using its private key and joins the network using the network key.

It is noted that all steps under (1) to (5) are performed while the NFC session between the networkable device 202 and the gateway 204 is active. Thus, the network key is delivered securely to the networkable device 202 in a relatively short time frame. Furthermore, since the NFC tag 616 may be a passive tag that is powered by the field generated by the NFC reader 618 and not by the networkable device 202, the networkable device 202 does not have to be powered during the NFC session. This is useful, because the networkable device 202 might not have access to a power source when it is brought close to an immovable gateway 204.

Figure 7:
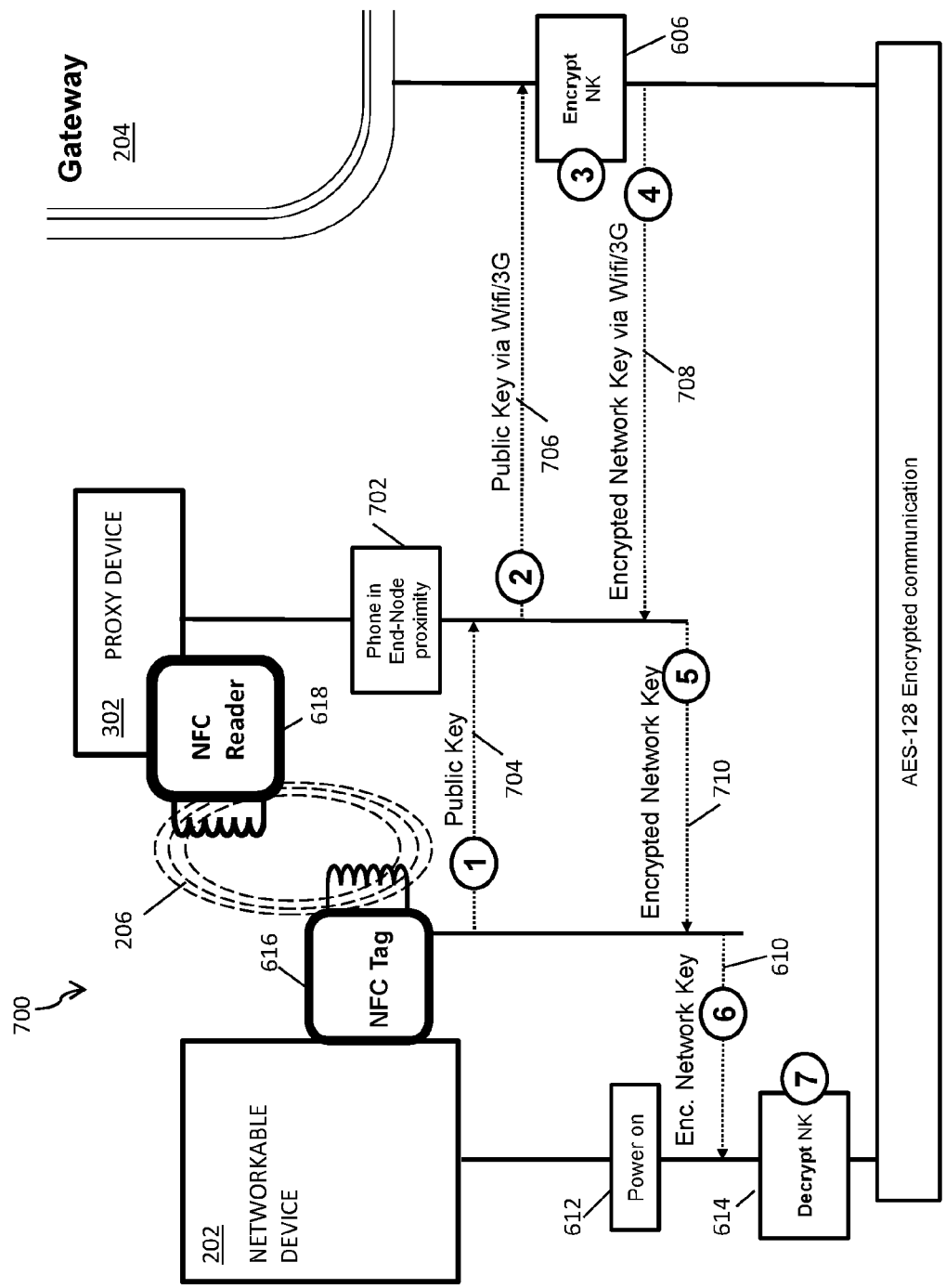
FIG. 7 shows a further illustrative embodiment of a method for facilitating network joining.

FIG. 7 shows a further illustrative embodiment of a method 700 for facilitating network joining. In this example, an NFC-enabled smart phone 302 is used as a proxy device. A communication session, which comprises two parts, may be established between the networkable device 202 and the gateway 204. The first part of the communication session is an NFC session between the networkable device 202 and the phone 302. The second part of the communication session is a wireless communication session between the phone 302 and the gateway 204, for example a Wi-Fi communication session or a 3G cellular communication session. Through the NFC tag 616, the networkable device 202 exposes a public key. In order to initiate the method, the user brings, at 702, the networkable device 202 into close proximity of the phone 302, such that an NFC session becomes active between the NFC tag 616 and the phone 302. Furthermore, in this embodiment, in order to transfer the network key securely to the networkable device 202, the following steps are performed while said communication session is active:

1) At 704, the phone 302 reads the public key from the NFC tag 616;

2) At 706, the phone 302 sends the public key via the wireless connection to the gateway 204;

3) At 606, the gateway 204 encrypts the network key with this public key;

4) At 708, the gateway 204 returns the encrypted network key to the phone 302 via the wireless connection;

5) At 710, the phone 302 writes the encrypted network key into the NFC tag 616;

6) At 612, upon or after said writing, the networkable device 202 is powered up and reads 610 the encrypted network key from its NFC tag 616 via a wired connection;

7) At 614, a processing component of the networkable device 202 decrypts the encrypted network key using its private key and joins the network using the network key.

Figure 8:
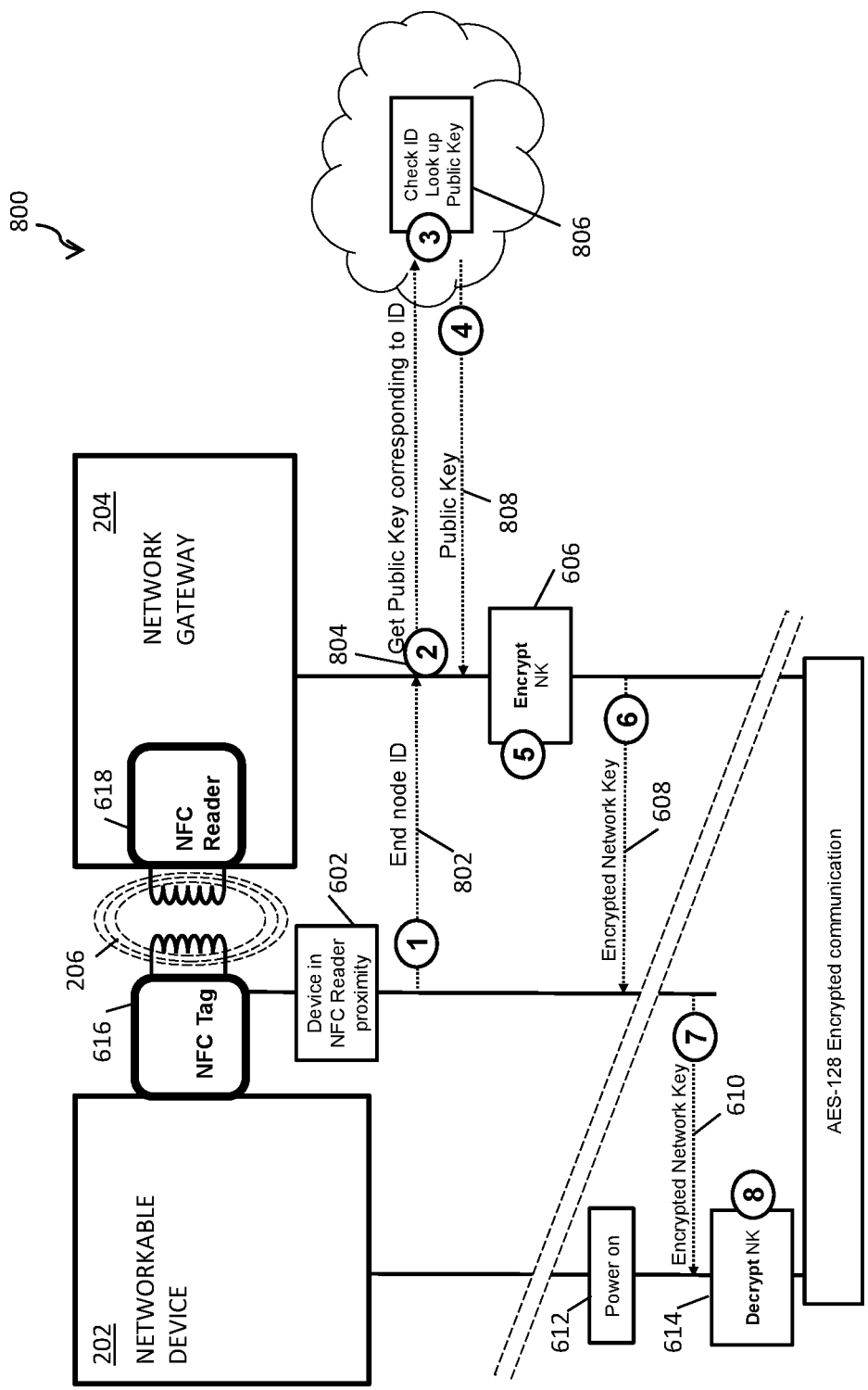
FIG. 8 shows a further illustrative embodiment of a method for facilitating network joining.

FIG. 8 shows a further illustrative embodiment of a method 800 for facilitating network joining. The method 800 is applied in a system which comprises a networkable device 202 and a gateway 204, between which an NFC session may be established. In particular, the NFC session may established between an NFC tag 616 comprised in, or connected to, the networkable device 202, and an NFC reader 618 comprised in the gateway 204. In this example, the networkable device 202 exposes, through the NFC tag 616, a device identifier which identifies the networkable device 202. In order to initiate the method, the user brings, at 602, the networkable device 202 into close proximity of the gateway 204, in particular to the NFC reader 618, such that an NFC session between the NFC tag 616 and the NFC reader 618 becomes active. This embodiment may achieve that the networkable device 202 is authenticated as a certified device before the network key is provided to it. In particular, in this embodiment, in order to transfer the network key securely to the networkable device 202, the following steps are performed while the NFC session is active:

1) At 802, the gateway 204 reads the device identifier from the NFC tag 616;

2) At 804, the gateway 204 sends the device identifier to a cloud database;

3) At 806, the cloud database looks up the public key corresponding to the device identifier;

4) At 808, if the cloud database has found an entry for the device identifier, it returns the corresponding public key to the gateway 204;

5) At 606, the gateway 204 encrypts the network key with this public key;

6) At 608, the gateway 204 writes the encrypted network key into the NFC tag;

7) At 612, upon or after said writing, the networkable device 202 is powered up and reads 610 the encrypted network key from its NFC tag 616 via a wired connection;

8) At 614, a processing component of the networkable device 202 decrypts the encrypted network key using its private key and joins the network using the network key.

Figure 9:
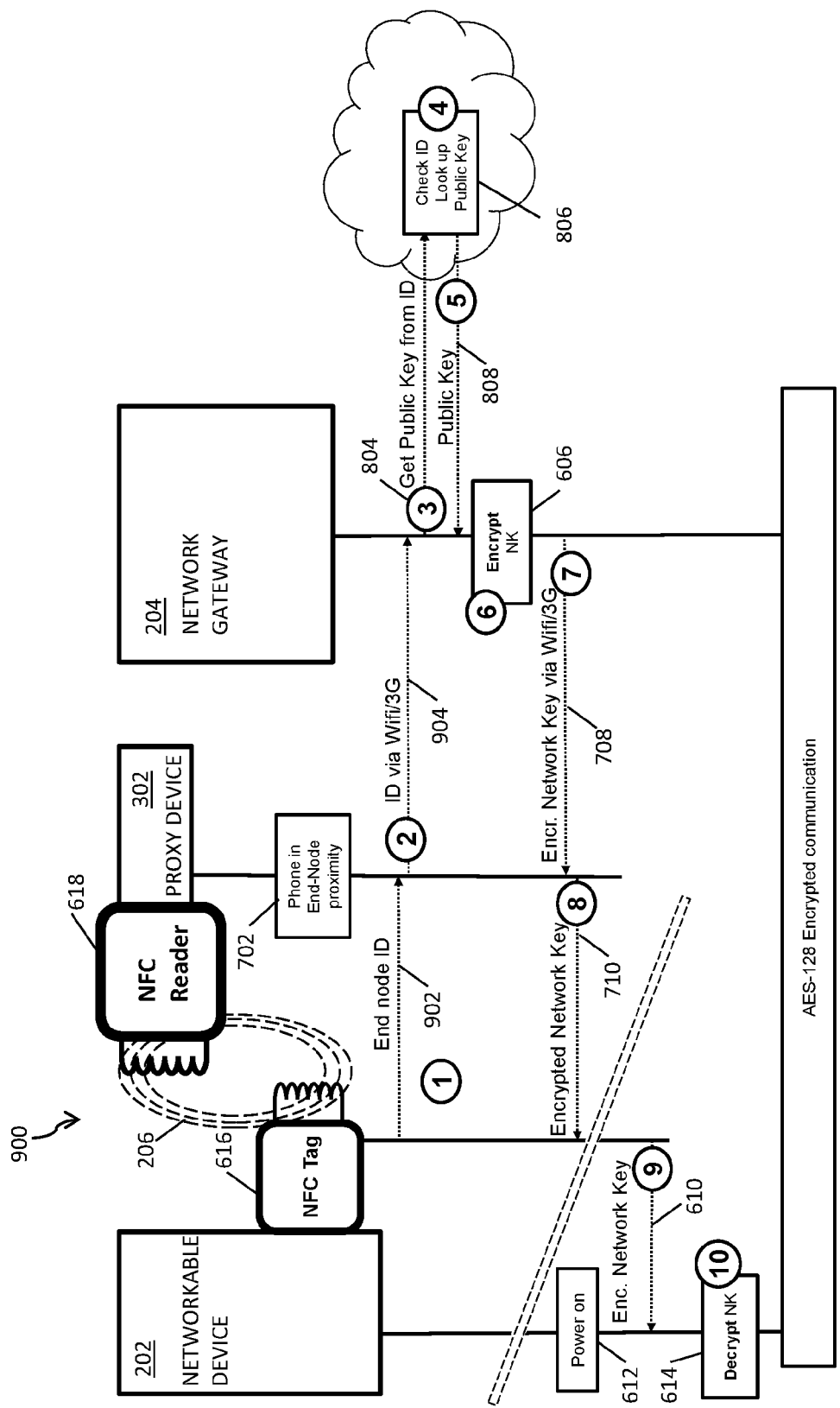
FIG. 9 shows a further illustrative embodiment of a method for facilitating network joining.

FIG. 9 shows a further illustrative embodiment of a method for facilitating network joining. In this example, an NFC-enabled smart phone 302 is used as a proxy device. A communication session, which comprises two parts, may be established between the networkable device 202 and the gateway 204. The first part of the communication session is an NFC session between the networkable device 202 and the phone 302. The second part of the communication session is a wireless communication session between the phone 302 and the gateway 204, for example a Wi-Fi communication session or a 3G cellular communication session. Through the NFC tag 616, the networkable device 202 exposes a device identifier. In order to initiate the method, the user brings, at 702, the networkable device 202 into close proximity of the phone 302, such that an NFC session becomes active between the NFC tag 616 and the phone 302. This embodiment may achieve that the networkable device 202 is authenticated as a certified device before the network key is provided to it. In particular, in this embodiment, in order to transfer the network key securely to the networkable device 202, the following steps are performed while said communication session is active:

1) At 902, the phone 302 reads the device identifier from the NFC tag 616;
2) At 904, the phone 302 sends the device identifier via the wireless connection to the gateway 204;
3) At 804, the gateway 204 sends the device identifier to a cloud database;
4) At 806, the cloud database looks up the public key corresponding to the device identifier;
5) At 808, if the cloud database has found an entry for the device identifier, it returns the corresponding public key to the gateway 204;
6) At 606, the gateway 204 encrypts the network key with this public key;
7) At 708, the gateway 204 returns the encrypted network key to the phone 302 via the wireless connection;
8) At 710, the phone 302 writes the encrypted network key into the NFC tag 616;
9) At 612, upon or after said writing, the networkable device 202 is powered up and reads 610 the encrypted network key from its NFC tag 616 via a wired connection;
10) At 614, a processing component of the networkable device 202 decrypts the encrypted network key using its private key and joins the network using the network key.

Alternatively, the phone 302 may access the cloud database directly in order to obtain the public key and subsequently provide this public key to the gateway 204; this operation may replace steps (2) to (5).

In the above-described illustrative embodiments, the public key associated with the networkable device 202 is used by the network gateway 204 to encrypt the network key. In other illustrative embodiments, however, the public key associated with the networkable device 202 may be used in a key agreement procedure executed between the networkable device 202 and the network gateway 204, in order to establish a shared secret session key, as explained in more detail below. The key agreement procedure may be a Diffie-Hellman key exchange procedure. Furthermore, the key agreement procedure may be executed directly between the networkable device 202 and the network gateway 204, or, if applicable, through the proxy device 302. For example, the following steps may be performed in order to transfer the network key securely to the networkable device:

1) If the networkable device 202 does not have a public-private key pair yet, it generates one;
2) The networkable device 202 exposes its public key in its NFC tag 616, so that the gateway 204 may retrieve it, if applicable through the proxy device 302;
3) If the gateway 204 does not have a public-private key pair yet, it generates one;
4) The gateway 204 writes its public key to the NFC tag 616, if applicable through the proxy device 302, whereafter the networkable device 202 retrieves the public key from its NFC tag 616;
5) Both the networkable device 202 and the gateway 204 generate a secret session key in dependence on their own private key and the retrieved public key;
6) The gateway 204 encrypts the network key using its generated secret session key;
7) The gateway 204 sends the encrypted network key to the NFC tag 616, if applicable through the proxy device 302;
8) The networkable device 202 wakes up (if necessary), retrieves the encrypted network key from its NFC tag 616, decrypts the encrypted network key using its generated secret session key, and uses the network key to join the network.

It is noted that, also in these illustrative embodiments, the public key which is used by the gateway 204 to generate its secret session key may be retrieved from a cloud database instead of retrieving it from the NFC tag 616. In that case, the networkable device 202 exposes, in step (2), a device identifier in its NFC tag 616, such that the gateway 204 may retrieve said identifier (if applicable through the proxy device 302) and retrieve, by means of said identifier, the networkable device's public key from the cloud database. In that case, the networkable device's public key should have been made available to the cloud database before the method is initiated. Furthermore, since, for instance, only public keys of certified networkable devices may be stored in the cloud database, a certification process may have to be executed before the method is initiated.

Thus, in accordance with the present disclosure, providing a network key to an NFC-enabled networkable device may be accomplished intuitively by a single touch of said device with another NFC-enabled device, i.e. either a network gateway or a gateway's proxy device. This intuitiveness may facilitate the network joining and reduce the possibility of mistakes. Furthermore, the networkable device does not have to be powered during the procedure, which may further facilitate the network joining. At the same time, the procedure is secure, in the sense that the network key is not exposed in plaintext, neither on the NFC interface nor in an intermediate commissioning device, for example in the proxy device. It is noted that the networkable device may implicitly be authenticated by the end-user as an "intended" device (i.e. a device which according to the user, who is able to perform a visual inspection of it, legitimately intends to join the network) by the mere act of touching it. This implicit authentication may ensure that only the intended device joins the network and that no other device joins it, either mistakenly or maliciously. Optionally, steps may be added in order to authenticate a networkable device explicitly, in particular as a certified device, in which case the network key may be provided to it only if it is found to be authentic.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 method for facilitating network joining
102 obtain first cryptographic key
104 encrypt network key
106 provide encrypted network key
200 system for facilitating network joining
202 networkable device
204 network gateway
206 near field communication (NFC)
300 system for facilitating network joining
302 proxy device
304 wireless communication
400 system for facilitating network joining
402 networked device
404 networked device
406 networked device
500 system for facilitating network joining
502 cloud database
600 method for facilitating network joining
602 networkable device brought in close proximity of NFC reader
604 retrieve public key
606 encrypt network key
608 return encrypted network key
610 retrieve encrypted network key
612 networkable device powered up
614 decrypt encrypted network key
616 NFC tag
618 NFC reader
700 method for facilitating network joining
702 NFC-enabled phone brought in close proximity of networkable device
704 retrieve public key
706 forward public key
708 return encrypted network key
710 forward encrypted network key 800 method for facilitating network joining
802 retrieve device identifier
804 request public key
806 look up public key
808 return public key
900 method for facilitating network joining
902 retrieve device identifier
904 forward device identifier

The invention claimed is:

1. A method for facilitating network joining, wherein, while a communication session is active between a network gateway and an NFC device comprised in or connected to a networkable device, the following steps are performed in an NFC session between the networkable device and a proxy device of the network gateway, wherein the proxy device is in close proximity of the networkable device:
   obtaining, with the network gateway, a first cryptographic key associated with the networkable device;
   encrypting, with the network gateway, using said first cryptographic key, a network key associated with a network;
   providing, with the network gateway, the encrypted network key to the networkable device, such that the networkable device may decrypt the encrypted network key using a second cryptographic key.

2. The method as claimed in claim 1, wherein said communication session is a communication session between said NFC device and a further NFC device comprised in the network gateway.

3. The method as claimed in claim 2, wherein the network gateway provides the encrypted network key to the networkable device by causing the further NFC device to write said encrypted network key to said NFC device.

4. The method as claimed in claim 1, wherein said communication session comprises a first part, which is a communication session between said NFC device and a further NFC device comprised in the proxy device, and a second part, which is a wireless communication session between the proxy device and the network gateway.

5. The method as claimed in claim 4, wherein the network gateway provides the encrypted network key to the networkable device by sending said encrypted network key to the proxy device, such that the proxy device may cause the further NFC device to write said encrypted network key to said NFC device.

6. The method as claimed in claim 1, wherein the first cryptographic key is a public key and the second cryptographic key is a corresponding private key.

7. The method as claimed in claim 1, wherein the first cryptographic key and the second cryptographic key are secret session keys which are established in a key agreement procedure between the network gateway and the networkable device.

8. The method as claimed in claim 7, wherein a public key associated with the networkable device is used in said key agreement procedure.

9. The method as claimed in claim 6, wherein said public key is retrieved from the NFC device.

10. The method as claimed in claim 6, wherein said public key is retrieved from a cloud database using a device identifier which identifies the networkable device.

11. The method as claimed in claim 10, wherein said device identifier is retrieved from the NFC device.

12. The method as claimed in claim 1, wherein the NFC device is an NFC tag.

13. A non-transitory computer readable medium comprising instructions which, when being executed by a processing unit, cause said processing unit to carry out or control a method for facilitating network joining in an NFC session between a networkable device and a proxy device of a network gateway, wherein the proxy device is in close proximity of the networkable device, the non-transitory computer readable medium comprising:
   instructions for obtaining, with the network gateway, a first cryptographic key associated with the networkable device;
   instructions for encrypting, with the network gateway, using said first cryptographic key, a network key associated with a network; and
   instructions for providing, with the network gateway, the encrypted network key to the networkable device, such that the networkable device may decrypt the encrypted network key using a second cryptographic key.

14. A system for facilitating network joining comprising a network gateway which is arranged to, while a communication session is active between said network gateway and an NFC device comprised in or connected to a networkable device, wherein the network gateway is configured in an NFC session between the networkable device and a proxy device of the network gateway, wherein the proxy device is in close proximity of the networkable device, to obtain a first cryptographic key associated with the networkable device, encrypt, using said first cryptographic key, a network key associated with a network, and provide the encrypted network key to the networkable device, such that the networkable device may decrypt the encrypted network key using a second cryptographic key.

15. The method of claim 1, wherein the networkable device comprises an NFC tag configured for powerless commissioning of the networkable device.

16. The method of claim 1, wherein the proxy device is embodied as an NFC-enabled smart phone.

17. The system of claim 14, wherein the system comprises a cloud database configured to store a plurality of public keys.

18. The method of claim 17, wherein the cloud database is configured to look up a public key that corresponds to a device identifier.

* * * * *